(12) United States Patent
Sjögren et al.

(10) Patent No.: US 8,416,808 B2
(45) Date of Patent: Apr. 9, 2013

(54) PACKET INDICATOR FOR RLC PROTOCOL

(75) Inventors: Tommy Sjögren, Malmö (SE); Andreas Bergström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 750 days.

(21) Appl. No.: 12/481,027

(22) Filed: Jun. 9, 2009

(65) Prior Publication Data

US 2010/0150062 A1 Jun. 17, 2010

Related U.S. Application Data

(60) Provisional application No. 61/096,429, filed on Sep. 12, 2008, provisional application No. 61/146,766, filed on Jan. 23, 2009.

(51) Int. Cl.
*H04J 3/16* (2006.01)
*H04J 3/22* (2006.01)
*H04J 3/24* (2006.01)

(52) U.S. Cl. .................. 370/469; 370/474
(58) Field of Classification Search .......... 370/328, 370/474
See application file for complete search history.

(56) References Cited

U.S. PATENT DOCUMENTS

| | | | | |
|---|---|---|---|---|
| 6,600,746 | B1 * | 7/2003 | Petersen | 370/394 |
| 7,181,667 | B2 * | 2/2007 | Argyropoulos et al. | 714/748 |
| 7,197,024 | B2 * | 3/2007 | Huo | 370/338 |
| 7,649,858 | B2 * | 1/2010 | Sipola | 370/314 |
| 7,675,941 | B2 * | 3/2010 | Kim et al. | 370/473 |
| 7,817,642 | B2 * | 10/2010 | Ma et al. | 370/395.4 |
| 7,961,704 | B2 * | 6/2011 | Meyer et al. | 370/349 |
| 2004/0114565 | A1 * | 6/2004 | Sipola | 370/349 |
| 2004/0196861 | A1 * | 10/2004 | Rinchiuso et al. | 370/441 |
| 2005/0207392 | A1 | 9/2005 | Sivalingham et al. | |
| 2007/0076680 | A1 * | 4/2007 | Amram et al. | 370/349 |
| 2007/0229214 | A1 * | 10/2007 | Meirick et al. | 340/2.23 |
| 2008/0192680 | A1 * | 8/2008 | Meyer et al. | 370/328 |
| 2008/0279218 | A1 * | 11/2008 | Jiang | 370/470 |
| 2009/0074046 | A1 * | 3/2009 | Huang et al. | 375/227 |
| 2009/0310537 | A1 * | 12/2009 | Bucknell et al. | 370/328 |

OTHER PUBLICATIONS

3RD Generation Partnership Project. 3GPP TS 44.060, V8.3.0 (Dec. 2008). 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8). Dec. 2008.

* cited by examiner

*Primary Examiner* — Farah Faroul
(74) *Attorney, Agent, or Firm* — Coats & Bennett, P.L.L.C.

(57) ABSTRACT

In a communication terminal implementing a radio link control (RLC) protocol, error propagation to higher layer protocols is mitigated by use of an additional length indicator, referred to herein as a new packet indicator, in the RLC data blocks to indicate the beginning of a new higher layer packet in addition to a conventional length indicator to indicate the last segment of a higher layer packet. The new packet indicator prevents the Logical Link Control (LLC) data segment at the beginning of an RLC data block from being concatenated with an LLC data segment in the previous data block even when length indicators in the previous data block are not received.

14 Claims, 8 Drawing Sheets

PACKET INDICATOR FOR RLC PROTOCOL

RELATED APPLICATIONS

This application claims the benefit of U.S. Provisional Patent Application Ser. No. 61/096429, filed Sep. 12, 2008; and Ser. No. 61/146766, filed Jan. 23, 2009, which are incorporated herein by reference.

BACKGROUND

The present invention relates generally to radio link control protocols for wireless communication networks and, more particularly, to methods and apparatus for segmentation and reassembly of higher layer data packets to improve robustness to packet loss.

Radio link control (RLC) is a protocol used in wireless communication networks to reduce the error rate over wireless channels. RLC divides higher layer packets, into smaller units called RLC data blocks for transmission over the wireless communication channel. Depending on the RLC operating mode, a retransmission protocol may be used to ensure delivery of each RLC data block. If an RLC data blocks is missed at the receiver, the receiver can request retransmission of the missing RLC data blocks. The higher layer packets reassembled from the received RLC data blocks at the receiver.

The RLC protocol has three main modes of operation: acknowledged mode (AM), unacknowledged mode (UM), and non-persistent mode (NPM). In AM, RLC uses a retransmission protocol to ensure delivery of all RLC data blocks. If an RLC data block is missed at the receiving terminal, the receiving terminal can request retransmission of the missing RLC data block. In UM, there is no retransmission and RLC ignores any missing packets. In NPM, RLC also uses a retransmission protocol to request retransmission of missing RLC data blocks. NPM differs from AM in that retransmissions for the same RLC data block are limited to a predetermined time period following the first transmission. NPM is useful, for example, for transmission of VoIP packets and other situations where packet latency is a concern.

In RLC, length indicators are used to indicate the ends of higher layer packets. More specifically, when the RLC data block contains the final segment of a higher layer packet, a length indicator is added to the RLC data block to indicate that it contains the last segment of a higher layer data packet and the length of the final segment. The loss of an RLC data block containing one of these length indicators may cause the RLC layer to reassemble the higher layer packets incorrectly, which may cause greater data loss at the higher layer. This effect is referred to herein as error propagation. Error propagation results in some higher layer packets being retransmitted and/or discarded even though the higher layer packets were correctly received. Therefore, there is a need for improvements in RLC protocols to prevent error propagation to higher layer protocols and thereby increase robustness to RLC packet loss.

SUMMARY

The present invention provides a robust RLC segmentation and concatenation procedure for RLC to mitigate the problem of error propagation to higher layer protocols. More particularly, embodiments of the present invention mitigate error propagation to higher layer protocols by use of an additional length indicator, referred to herein as a new packet indicator, in the RLC data blocks to indicate the beginning of a new higher layer packet in addition to a conventional length indicator to indicate the length of the last segment of a higher layer packet. The new packet indicator prevents the higher layer data segment at the beginning of an RLC data block from being concatenated with data in the previous RLC data block even when length indicators in the previous data block are not received.

One exemplary embodiment comprises a method of transmitting data packets from a transmitting terminal. The method comprises encapsulating a data segment for a higher layer data packet in a lower layer data packet, adding a new packet indicator set to a predetermined value to the lower layer data packet if the data segment comprises the beginning of a new higher layer data packet to indicate the start of a new higher layer data packet, and adding a length indicator to the lower layer data packet if the data segment comprises the end of a higher layer data packet.

Another exemplary embodiment comprises a communication terminal (e.g., base station or mobile terminal) for transmitting data to a remote terminal. The communication terminal comprises a transceiver for transmitting and receiving signals over a wireless communication channel, and a processor to generate data packets for transmission over the wireless communication channel. The processor is configured to encapsulate a data segment for a higher layer data packet in a lower layer data packet, add a new packet indicator set to a predetermined value to the lower layer data packet if the data segment comprises the beginning of a new higher layer data packet to indicate the start of a new higher layer data packet, and add a length indicator to the lower layer data packet if the data segment comprises the end of a higher layer data packet.

DETAILED DESCRIPTION

Figure 1:
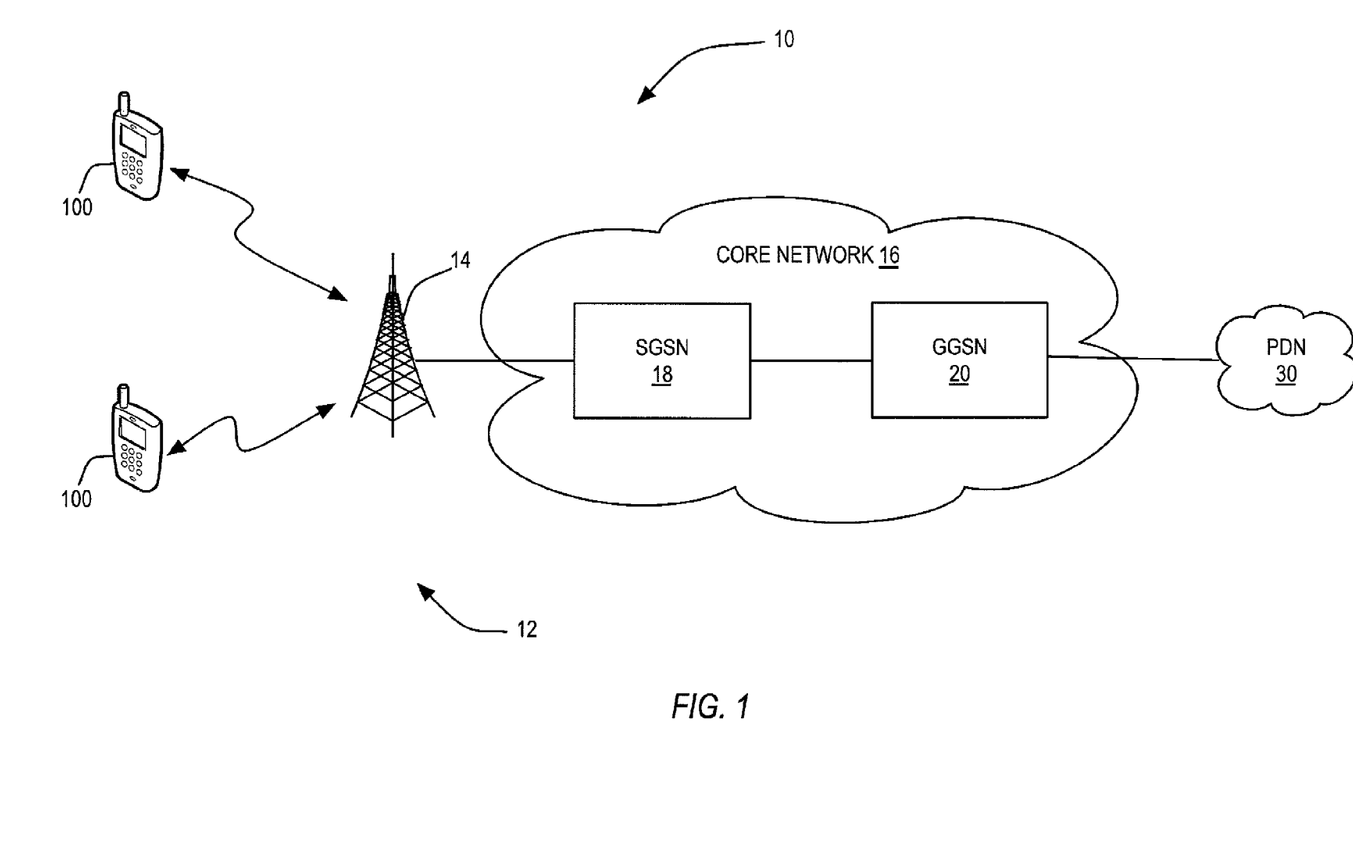
FIG. 1 illustrates an exemplary mobile communication system providing connection to an external packet data network.

Referring now to the drawings, the present invention will be described in the context of an exemplary mobile communication system 10 based on the Enhanced General Packet Radio Service (EGPRS) standard by the Third Generation Partnership Project (3GPP). The EGPRS network 10, shown in FIG. 1, comprises a GSM/EGPRS radio access network (GERAN) 12 and a core network 16. The GERAN 12 typically comprises one or more base station subsystems (BSSs) 14. Each BSS 14 comprises a base station controller (BSC)

and one or more base transceiver stations (BTSs), which may be co-located or in separate locations. The BTSs comprise the antennas, RF equipment, and baseband processing circuits needed to communicate with mobile terminals 100. The BSC manages the radio resources used for communication with the mobile terminal 100 and provides a connection to the core network 16.

The core network 16 includes one or more serving GPRS support nodes (SGSNs) 18 and one or more gateway GPRS support node (GGSN) 20. The SGSN 18 provides support for packet switched communications, handles session management and mobility management functions for the packet switched services, and provides a connection to a GGSN 20. The GGSN 20 serves as a gateway between the core network 16 network and external packet data networks 30, e.g., the Internet. For packet data communication, the mobile terminal 100 establishes a communication session with an SGSN 18, and the GGSN 20 connects the SGSN 18 with the external packet data networks 30. A more detailed description of the core network 16 is readily available in the relevant EGPRS standards.

Figure 2:
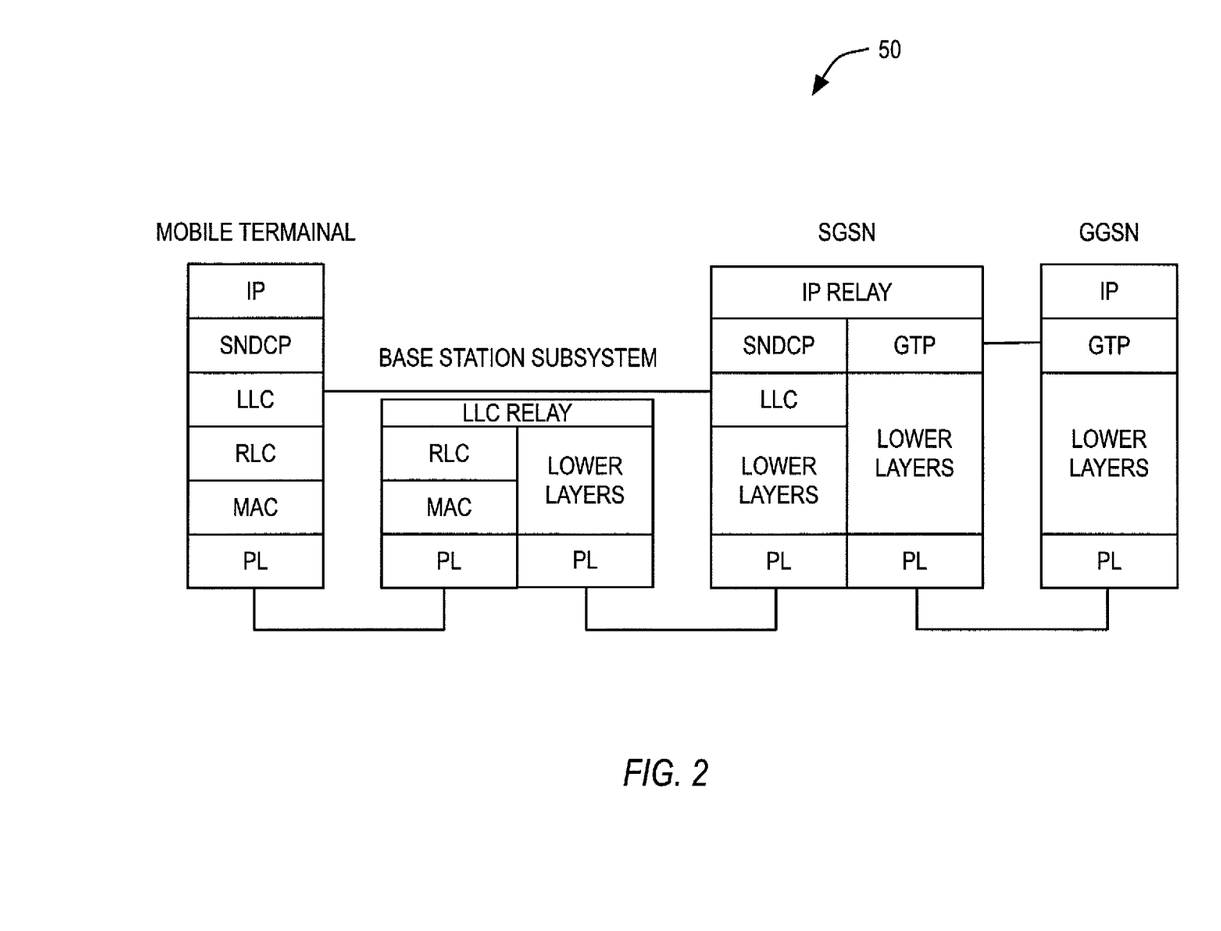
FIG. 2 illustrates an exemplary protocol stack for a mobile communication system for transmitting IP packets between a mobile terminal and an external packet data network.

FIG. 2 provides a simplified illustration of a protocol stack 50 used for transmission of packet data between the mobile terminal 100 and SGSN 18. The protocol stack 50 includes a plurality of protocol layers. The various layers of the protocol stack 50 represent a set of programs and protocols that may be implemented by software running on a host computing device including a processor and memory. Each layer encapsulates data received from a higher layer protocol to generate protocol data units (PDUs) that are passed down to the next lower layer. The term PDU as used herein is synonymous with the term packet.

The SGSN 18 receives IP packets from the GGSN 20. IP packets or other data packets may, for example, be transmitted to the SGSN 18 using the GPRS tunneling protocol (GTP). The protocol stack 50 implemented by the SGSN 18 and mobile terminal 100 includes a Sub Network Dependent Convergence Protocol (SNDCP) layer, Logical Link Control (LLC) layer, Radio Link Control (RLC) layer, Medium Access Control (MAC) layer, and a Physical layer (PL). The SNDCP layer converts the IP packets into a format compatible with the underlying GPRS network architecture. SNDCP PDUs are passed to the Logical Link Control (LLC) layer. The LLC layer provides a logical connection between the SGSN 18 and mobile terminals 100. The LLC layer encapsulates the SNDCP PDUs with an LLC header to generate LLC PDUs. The Base Station System GPRS Protocol (BSSGP) layer (not shown) routes the LLC PDU to the serving BSS 14 (e.g., over a frame relay physical layer). The BSSGP operates between the SGSN 18 and the BSS, e.g., the BSSGP does not extend over the air interface.

At the BSS 14, the LLC PDU is provided to the Radio Link Control (RLC) layer. The RLC layer establishes a reliable link (e.g., if required by the QoS of the corresponding packet switched service) between the BSS 14 and mobile terminal 100. The RLC layer performs segmentation and reassembly of upper-layer PDUs (LLC PDUs in this example) into RLC packets, which are referred to herein as RLC data blocks. The RLC data blocks are then passed to the Medium Access Control (MAC) layer which encapsulates the RLC data blocks with MAC headers. The MAC layer controls access signaling across the air interface, including the assignment of uplink and downlink radio blocks which are used to carry the RLC data blocks. The data is then transmitted to a mobile terminal 100 over the air interface via the physical layer. The physical layer is responsible for converting data received from the MAC layer into a bit stream suitable for transmission to the mobile terminal 100 over the radio interface.

The RLC protocol has three main modes of operation: acknowledged mode (AM), unacknowledged mode (UM), and non-persistent mode (NPM). In AM, RLC implements a retransmission protocol to ensure delivery of all RLC data blocks. If an RLC PDU is missed at the receiving terminal, the receiving terminal can request retransmission of the missing RLC PDU. In UM, there is no retransmission and RLC ignores any missing packets. In NPM, RLC also uses a retransmission protocol to request retransmission of missing RLC data blocks. NPM differs from AM in that retransmissions for the same RLC data block are limited to a predetermined time period following the first transmission. NPM is useful, for example, for transmission of VoIP packets and other types of data where packet latency is one of the main concerns.

In RLC, length indicators are used to indicate the ends of higher layer packets, which in GPRS comprise LLC PDUs. More specifically, when the RLC packet contains the final segment of a higher layer packet, a length indicator is inserted into the RLC data block to indicate the end of the higher layer data packet. The loss of an RLC data block containing one of these length indicators may cause the RLC layer to reassemble the LLC PDUs incorrectly, which may cause greater data loss at the higher layer. This effect is referred to herein as error propagation.

Figure 3:
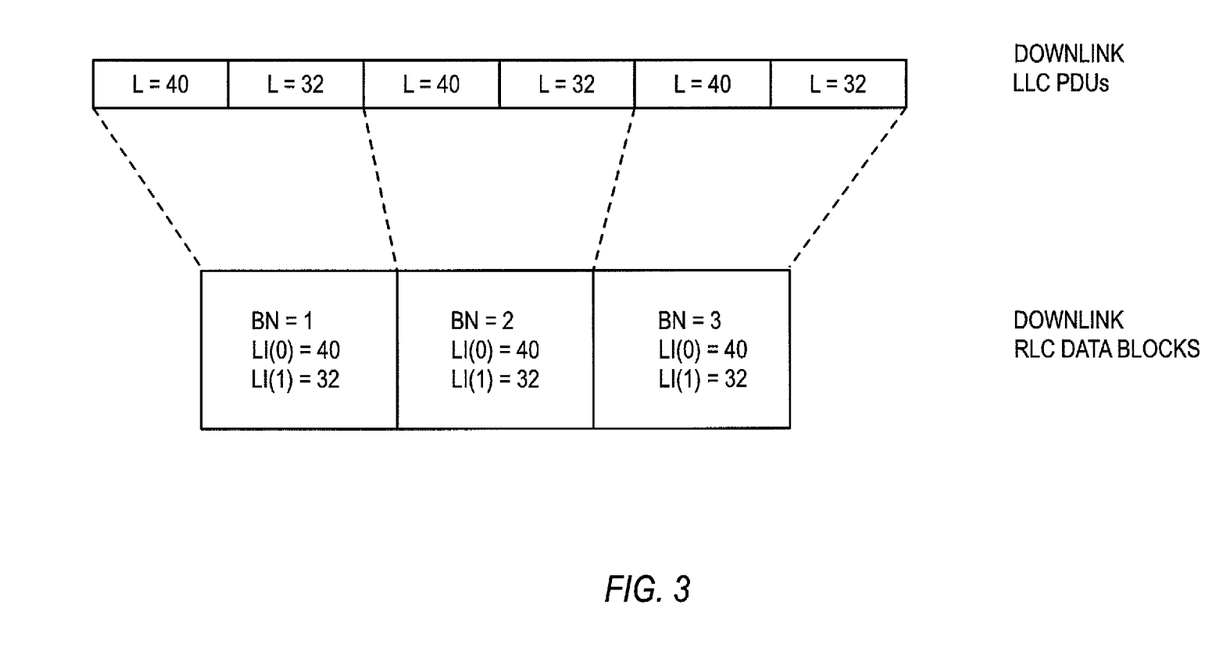
FIG. 3 illustrates an exemplary scenario for transmission of packets over a downlink channel where error propagation may occur.

The problem of error propagation can be illustrated with a simple example. FIG. 3 illustrates the transmission of six LLC PDUs which, for convenience, are referred to herein as LLCs 1-6. The length of each LLC PDU is indicated in FIG. 3. It is assumed that the modulation and coding scheme used is MCS6. With MCS6, the payload of each RLC data block contains 74 bytes. In this example, two LLC PDUs with a total of 72 bytes are encapsulated in each RLC data block. A 1-byte length indicator is added to each LLC PDU, which completely fills the payload of the RLC data block.

The three RLC data blocks are transmitted from the base station 14 to the mobile terminal 100 over a downlink channel. In this example, it is assumed that the second RLC data block is either lost (not received) or results in a decoding failure. In this case, the first two LLC PDUs (LLCs 1 and 2) carried in the first RLC data block will be passed to the LLC layer. The problem begins when the second RLC data block is unpacked. In this example, the lost RLC layer will be replaced by either zero padding or the erroneously decoded data. When the RLC layer unpacks the third RLC data block, the RLC layer will recognize that the 40-byte data segment corresponding to LLC 5 is the final segment of an LLC PDU. However, the RLC layer has no way of knowing whether the final segment is a complete LLC PDU or a continuation of the LLC transmitted in the previous RLC data block. Because the length indicators in the second RLC data block were not received, the RLC layer may incorrectly assume that LLC 5 is a continuation of the LLC PDU transmitted in the second RLC data block. Therefore, the RLC layer will concatenate the 40 bytes of actual LLC data received in the third RLC data block with the 74 bytes of data (zero padding or erroneously decoded data) associated with the second RLC data block to form an erroneous LLC PDU comprising 114 bytes. When the LLC layer receives the erroneous LLC PDU, the CRC check will fail. Thus, an extra LLC PDU will be lost due to error propagation.

According to one exemplary embodiment, error propagation is mitigated by the clever use of dummy LLC PDUs. For many types of applications, such as voice-over IP, many small LLC PDUs may be transmitted. When the LLC PDUs do not fill the RLC data block and there is no additional data to send, the RLC layer may generate dummy LLC PDUs to fill the RLC data block. Error propagation can be avoided in this case by properly sizing the dummy PDUs so that the dummy PDU without a corresponding length indicator completely fills the RLC data block. According to the existing standard, a special length indicator set to a value of 0 is used when the final segment of an LLC PDU without its corresponding length indicator completely fills an RLC data block. In this case, the length indicator for the final LLC segment is added to the next RLC data block and set to a value of 0. Thus, when a dummy LLC PDU completely fills the RLC data block, the transmitter will insert a length indictor set to a value of 0 in the next RLC data block. A RLC data block having a length indicator set to a value of 0 informs the receiver that a new LLC PDU begins in the RLC data block and prevents the receiver from concatenating the LLC PDU in the RLC data block with LLC data received in a previous RLC data block.

Figure 4:
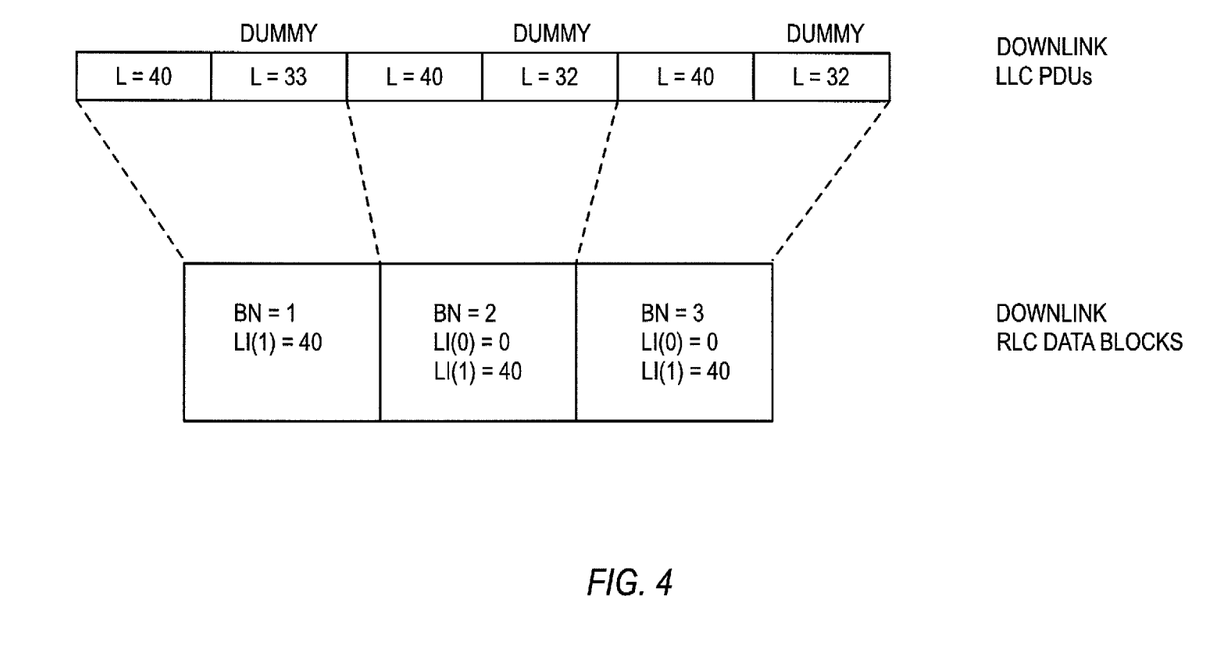
FIG. 4 illustrates an exemplary scenario for transmitting packets over a downlink connection to mitigate error propagation.

FIG. 4 illustrates how dummy LLC PDUs can be used to avoid error propagation. FIG. 4 illustrates the transmission of three actual LLC PDUs provided by the LLC layer and three dummy LLC PDUs generated by the RLC layer. In this example, three LLC PDUs comprising 40 bytes of actual data are transmitted in three RLC data blocks. The RLC data blocks are filled by dummy LLC PDUs. The dummy LLC PDU in the first RLC data block contains 33 bytes, while the dummy LLC PDU in each subsequent RLC data block contains 32 bytes. According to the existing standard, a length indicator set to a value of 0 is added to the second and third RLC data blocks.

The use of dummy LLC PDUs is prohibited on the uplink. Instead, filler bits may be used to fill an RLC data block when the LLC PDU ends in the RLC data block and there are no additional LLC PDUs to send. Conventionally, the RLC layer at the transmitter would transmit the RLC data block with two length indicators. The first length indicator is set to indicate the number of octets in the LLC data segment, and the second length indicator is set to 127 to indicate that the RLC data block contains filler bits. As previously described, when an RLC data block containing a length indicator is lost or incorrectly decoded at the base station 20, the base station 20 may have problems reassembling the LLC PDUs, which causes even greater loss at the LLC layer.

According to another embodiment of the present invention, error propagation is mitigated by use of an additional length indicator, referred to herein as a new packet indicator, in the RLC data blocks to indicate the beginning of a new higher layer packet, in addition to a conventional length indicator to indicate the last segment of a higher layer packet. As an example, a length indicator set to a value of 126 or some other predetermined value can be used as a new packet indicator to indicate the start of a new higher layer LLC PDU. The new packet indicator prevents concatenation with zero padding or erroneously decoded data in the event that a preceding RLC data block is lost or erroneously decoded.

In one exemplary embodiment, the new packet indicator is used only when the beginning segment of an LLC PDU is the first LLC data segment in the RLC data block, e.g., when the RLC data block begins with a new LLC PDU. A new packet indicator is not required in circumstances when the new LLC PDU begins in the middle of an RLC data block. In the case of an LLC PDU that begins in the middle of an RLC data block, the conventional length indicator for the final segment of the previous LLC PDU will indicate where the next LLC PDU begins.

In the case where an LLC PDU fits entirely within a single RLC data block, the RLC data block may have two length indicators. If the RLC data block begins with a segment of new LLC PDU, a new packet indicator is used to indicate the beginning of the LLC PDU. If the LLC PDU fits entirely within the RLC data block, a conventional length indicator is used to denote the ending of the last segment of an LLC PDU.

Figure 5:
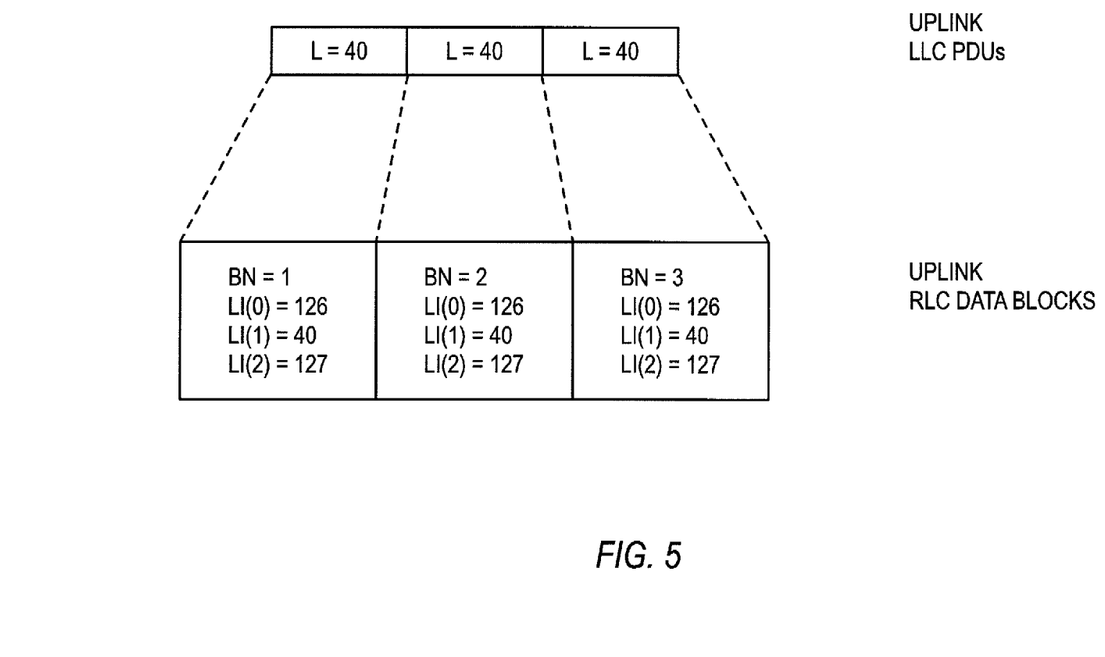
FIG. 5 illustrates an exemplary scenario for transmission of packets over an uplink channel to mitigate error propagation.

FIG. 5 illustrates the use of a new packet indicator in the uplink direction. As shown in FIG. 5, a new packet indicator may be inserted into the RLC data blocks to indicate the beginning segment of an LLC PDU. In the example shown in FIG. 5, three LLC packets are transmitted in three separate RLC data blocks. Each packet includes three length indicators. The first length indicator in each packet is a new packet indicator that is set to a predetermined value, which is 126 in the example. The second length indicator in each RLC data block is a conventional length indicator that indicates that the LLC PDU is 40 octets in length. The third and last length indicator in each RLC data block is set to a predetermined value to indicate that the RLC data block contains filler bits.

In the absence of the new packet indicator, the RLC layer may have problems reassembling the LLC packets in the event that the first or second RLC data block (BN1 or 2) is lost or erroneously decoded. In that case, the RLC layer may concatenate the actual LLC PDU contained in the subsequent RLC data block (BN=2 or 3) with the zero padding or erroneously decode data substituted for the second RLC data block. However, the new packet indicator in the subsequent RLC data block will prevent the RLC layer from concatenating the LLC PDU in the subsequent packet with the erroneous data substituted for the previous LLC PDU.

While the use of a new packet indicator is described for uplink transmissions, those skilled in the art will appreciate that a new packet indicator could also be used for downlink transmissions as well.

Figure 6:
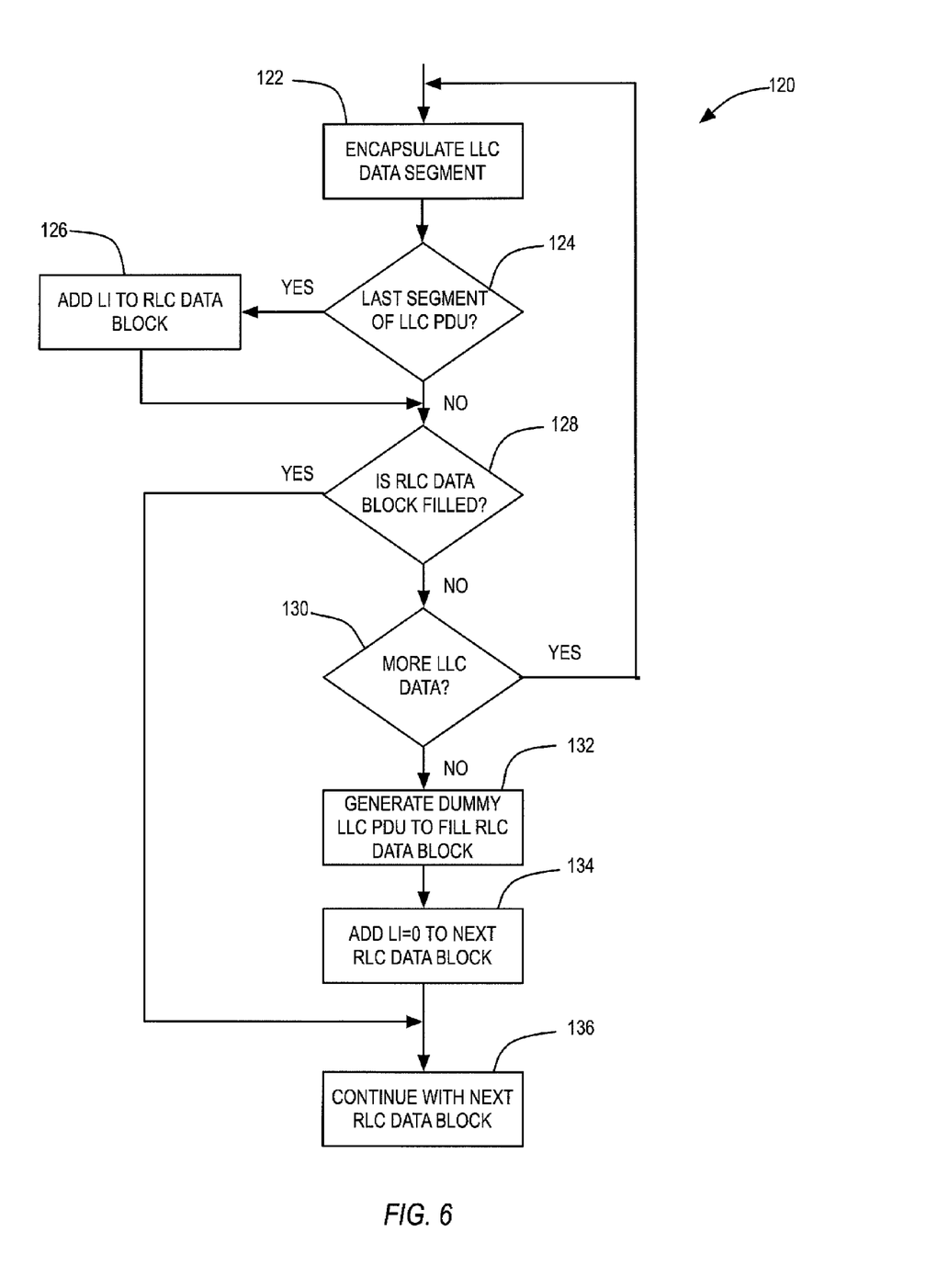
FIG. 6 illustrates an exemplary formatting procedure for formatting RLC data blocks using dummy LLC PDUs.

FIG. 6 illustrates an exemplary formatting procedure 120 implemented by a formatter in the LLC layer for formatting LLC data blocks transmitted on the downlink. Procedure 120 is applied to each LLC data segment in an RLC data block. Beginning with the first LLC data segment, the RLC layer encapsulates the LLC data segment in an RLC data block (block 122). The RLC layer then determines whether the LLC data segment is the final segment of an LLC PDU (block 124). If so, the RLC layer adds a conventional length indicator to the RLC data block to indicate the length of the LLC data segment (block 126). The formatter then determines whether the RLC data block is filled (block 128). If the LLC data segment fills the RLC data block, processing continues with the next RLC data block (block 136). If the RLC data block is not completely filled, the formatter determines whether there is more LLC data. If so, the formatter repeats blocks 122-126 until the RLC data block is filled. If there is no more data to send, the formatter generates a dummy LLC PDU if needed to fill the RLC data block (block 132) and adds a length indicator set to a value of 0 to the next RLC data block (block 134). The process is then repeated for the next LLC data segments (block 136).

Figure 7:
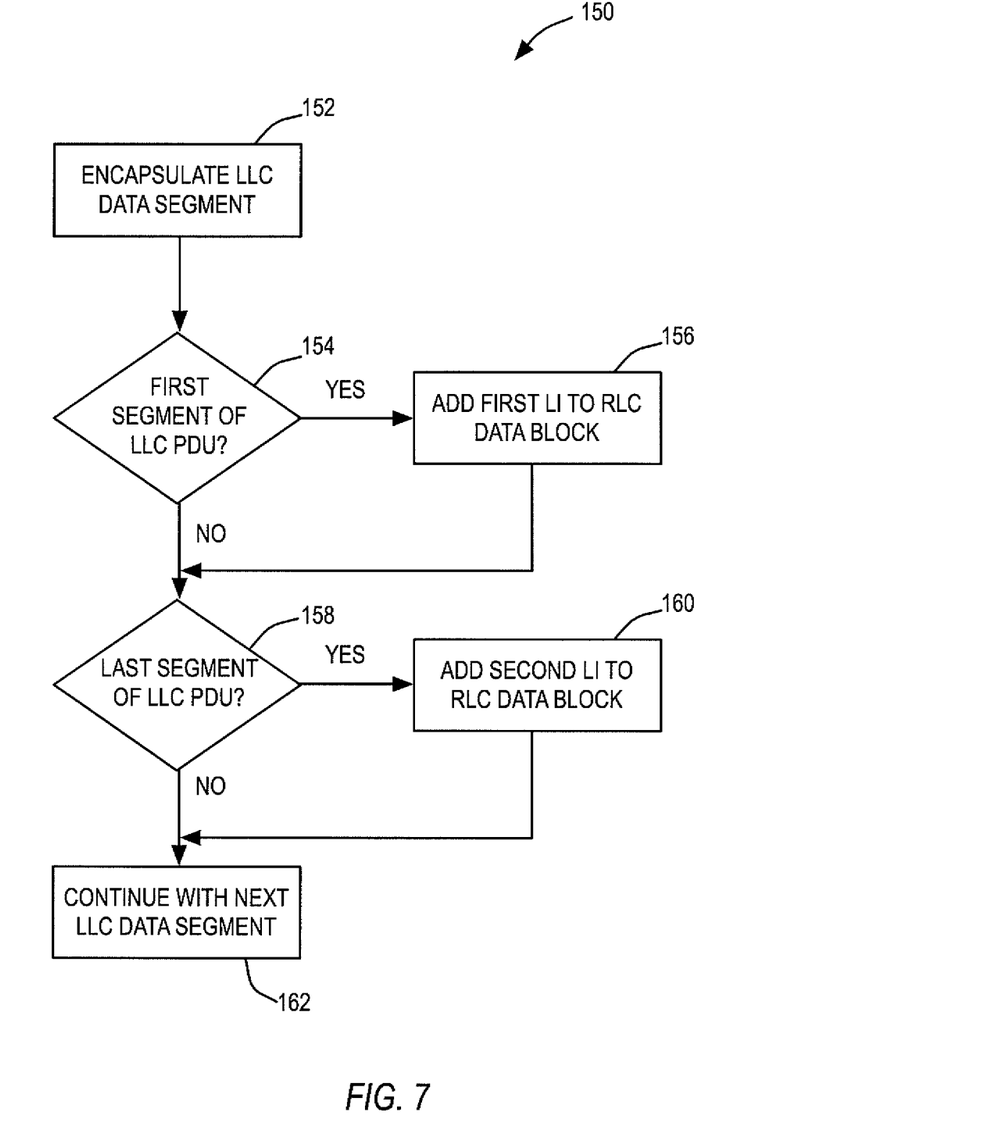
FIG. 7 illustrates an exemplary formatting procedure for formatting RLC data blocks using a new packet indicator.

FIG. 7 illustrates an exemplary formatting procedure 150 implemented by a formatter in the LLC layer for formatting LLC data blocks having a new packet indicator. The procedure 150 can be used for both uplink and downlink transmissions. Procedure 150 is applied to each LLC data segment in an RLC data block. Beginning with the first LLC data segment, the RLC layer encapsulates the LLC data segment in an RLC data block (block 152). The RLC layer then determines whether the encapsulated LLC data segment is the first segment of a new LLC PDU (block 154). If the LLC data segment is the first segment of an LLC PDU, the RLC layer adds a new packet indicator to the RLC data block to indicate that the LLC data segment is the start of a new higher layer PDU (block 156). As previously noted, the new packet indicator comprises a length indicator set to a predetermined value (e.g., LI=126). In either case, the RLC layer then determines whether the LLC data segment is the final segment of an LLC PDU (block 158). If so, the RLC layer adds a conventional length indicator to the RLC data block to indicate the length of the LLC data segment (block 160). The process is then repeated for each successive LLC data segment in the RLC data block (block 162).

Figure 8:
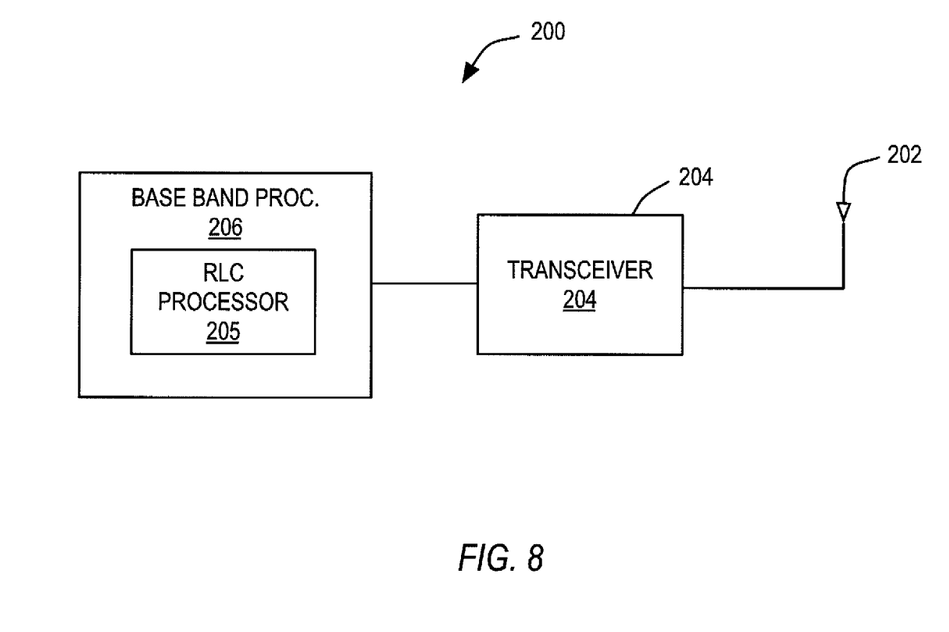
FIG. 8 illustrates an exemplary communication terminal including an RLC processor for formatting RLC data blocks.

FIG. 8 illustrates an exemplary communication terminal 200 for implementing the robust RLC procedures as described herein. Communication terminal 200 may comprise either a mobile terminal 100 or a base station 14. The communication terminal 200 includes a transceiver 204 coupled to an antenna 202 for transmitting and receiving signals. Baseband processor 206 processes signals transmitted to, and received by, the communication terminal 200. Exemplary processing performed by baseband processor 206 includes modulation/demodulation, interleaving/de-interleaving, coding/decoding, etc. The baseband processor 206 includes an RLC processor 208 for implementing RLC protocols as described herein. As described above, RLC processor 208 performs segmentation and concatenation of LLC PDUs and formats RLC data blocks. When the RLC data packets are formatted, the RLC processor 208 inserts a new packet indicator if the RLC data block begins with a segment of a new LLC PDU, and adds a conventional length indicator if the LLC data segment is the final segment of a higher layer PDU.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting data packets from a transmitting terminal, said method comprising:
    encapsulating a data segment for a higher layer data packet in a lower layer data packet;
    adding a new packet indicator set to a predetermined value to the lower layer data packet if the data segment comprises the beginning of a new higher layer data packet;
    adding a length indicator to the lower layer data packet if the data segment comprises the end of a higher layer data packet;
    wherein adding a new packet indicator comprises adding the new packet indicator to the lower layer data packet only when the lower layer data packet begins with a first segment of a new higher later data packet.

2. The method of claim 1 further comprising omitting the new packet indicator if the lower layer data packet begins with the last segment of a higher layer data packet.

3. The method of claim 1 wherein the length indicator indicates the length of the data segment.

4. The method of claim 1 wherein the higher layer data packet comprise Logical Link Control (LLC) Protocol Data Units (PDUs) and the lower layer data packet comprise Radio Link Control (RLC) data blocks for transmission over an Enhanced General Packet Radio Service network.

5. The method of claim 4 further comprising transmitting said lower layer data packet from a base station to a mobile terminal over a downlink channel.

6. The method of claim 4 further comprising transmitting said lower layer data packet from a mobile terminal to a base station over an uplink channel.

7. A communication terminal for a mobile communication network comprising:
    a transceiver for transmitting and receiving signals over a wireless communication channel; and
    a processor to generate data packets for transmission over the wireless communication channel, the processor configured to:
        encapsulate a data segment for a higher layer data packet in a lower layer data packet;
        add a new packet indicator set to a predetermined value to the lower layer data packet if the data segment comprises the beginning of a new higher layer data packet;
        add a length indicator to the lower layer data packet if the data segment comprises the end of a higher layer data packet;
    wherein the processor is configured to add the new packet indicator to the lower layer data packet only when the lower layer data packet begins with a first segment of a new higher later data packet.

8. The communication terminal of claim 7 wherein the processor is configured to omit the new packet indicator if the lower layer data packet begins with the last segment of a new higher layer data packet.

9. The communication terminal of claim 7 wherein the length indicator indicates the length of the data segment.

10. The communication terminal of claim 7 wherein the higher layer data packet comprise Logical Link Control (LLC) Packet Data Units (PDUs) and the lower layer data packet comprise Radio Link Control (RLC) data blocks for transmission over an Enhanced General Packet Radio Service network.

11. The communication terminal of claim 10 configured as a base station for transmitting said lower layer data packet over a downlink channel to a mobile terminal.

12. The communication terminal of claim 10 configured as a mobile terminal for transmitting said lower layer data packet over an uplink channel to a base station.

13. A method of transmitting data packets from a transmitting terminal, said method comprising:
    encapsulating a data segment for a higher layer data packet in a lower layer data packet;
    adding a first length indicator to the lower layer data packet if the data segment comprises the end of a higher layer data packet;
    generating a dummy higher layer packet sized to completely fill the lower layer data packet; and
    adding a second length indicator set to a predetermined value to the next lower layer data packet to indicate the start of a new higher layer packet;
    wherein adding the second length indicator comprises adding the second length indicator to the lower layer data packet only when the lower layer data packet begins with a first segment of a new higher later data packet.

14. A communication terminal for a mobile communication network comprising:
    a transceiver for transmitting and receiving signals over a wireless communication channel; and
    a processor to generate data packets for transmission over the wireless communication channel, the processor configured to:
        encapsulate a data segment for a higher layer data packet in a lower layer data packet;

add a first length indicator to the lower layer data packet if the data segment comprises the end of a higher layer data packet;
generate a dummy higher layer packet sized to completely fill the lower layer data packet; and
add a second length indicator set to a predetermined value to the next lower layer data packet to indicate the start of a new higher layer packet;

wherein the processor is configured to add the second length indicator to the lower layer data packet only when the lower layer data packet begins with a first segment of a new higher later data packet.

\* \* \* \* \*

UNITED STATES PATENT AND TRADEMARK OFFICE
CERTIFICATE OF CORRECTION

PATENT NO. : 8,416,808 B2
APPLICATION NO. : 12/481027
DATED : April 9, 2013
INVENTOR(S) : Sjogren et al.

Page 1 of 1

It is certified that error appears in the above-identified patent and that said Letters Patent is hereby corrected as shown below:

In the Drawings:

In Fig. 2, Sheet 2 of 8, delete "MOBILE TERMAINAL" and insert -- MOBILE TERMINAL --, therefor.

In the Specification:

In Column 5, Line 41, delete "base station 20, the base station 20" and insert -- base station 14, the base station 14 --, therefor.

In the Claims:

In Column 7, Line 54, in Claim 1, delete "later" and insert -- layer --, therefor.

In Column 8, Line 24, in Claim 7, delete "later" and insert -- layer --, therefor.

In Column 8, Line 58, in Claim 13, delete "later" and insert -- layer --, therefor.

In Column 9, Line 12, in Claim 14, delete "later" and insert -- layer --, therefor.

Signed and Sealed this
Twenty-fourth Day of September, 2013

Teresa Stanek Rea
*Deputy Director of the United States Patent and Trademark Office*